United States Patent
Bostick et al.

(10) Patent No.: US 10,089,122 B1
(45) Date of Patent: *Oct. 2, 2018

(54) CUSTOMIZING MOBILE DEVICE OPERATION BASED ON TOUCH POINTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Brian M. O'Connell, Wake, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,702

(22) Filed: Jan. 24, 2018

Related U.S. Application Data

(63) Continuation of application No. 15/655,935, filed on Jul. 21, 2017.

(51) Int. Cl.
*G06F 3/048* (2013.01)
*G06F 9/451* (2018.01)
(Continued)

(52) U.S. Cl.
CPC .......... *G06F 9/451* (2018.02); *G06F 3/0416* (2013.01); *G06F 3/0482* (2013.01);
(Continued)

(58) Field of Classification Search
CPC ............ G06F 3/041; G06F 3/048; G06F 9/44
See application file for complete search history.

(56) References Cited

U.S. PATENT DOCUMENTS

| 9,733,828 B2 * | 8/2017 | Ji ......................... G06F 3/04886 |
| 2008/0089587 A1 | 4/2008 | Kim et al. |

(Continued)

FOREIGN PATENT DOCUMENTS

| CN | 103955331 A | * | 7/2014 | |
| CN | 105426181 A | | 3/2016 | |
| CN | 105892865 A | * | 8/2016 | ........... G06F 3/0487 |

OTHER PUBLICATIONS

Bostick et al., "Customizing Mobile Device Operation Based on Touch Points", U.S. Appl. No. 15/655,935, filed Jul. 21, 2017, 27 pages.

(Continued)

*Primary Examiner* — Mahelet Shiberou
(74) *Attorney, Agent, or Firm* — Edward J. Wixted, III

(57) ABSTRACT

In an approach for customizing a mobile device interface based on touch points, a processor receives detection of points of contact between a user and a mobile device. A processor analyzes the points of contact between the user and the mobile device. A processor determines how many hands the user is holding the mobile device with. A processor determines a modification for a user interface for the mobile device, wherein determining the modification comprises: presenting a keyboard selected from the group consisting of: a first keyboard, based on a determination that the user is holding the mobile device with one hand, and a second keyboard, based on a determination that the user is holding the mobile device with two hands. A processor causes the modified user interface to be displayed on the mobile device.

1 Claim, 3 Drawing Sheets

(51) Int. Cl.
*G06F 3/0482* (2013.01)
*G06F 3/0481* (2013.01)
*G06F 3/0488* (2013.01)
*G06F 3/041* (2006.01)
*H04M 1/725* (2006.01)

(52) U.S. Cl.
CPC ...... *G06F 3/04817* (2013.01); *G06F 3/04886* (2013.01); *H04M 1/72522* (2013.01); *H04M 1/72569* (2013.01)

(56) References Cited

U.S. PATENT DOCUMENTS

| | | | |
|---|---|---|---|
| 2010/0153313 | A1 | 6/2010 | Baldwin et al. |
| 2014/0184519 | A1 | 7/2014 | Benchenaa et al. |
| 2014/0282051 | A1 | 9/2014 | Cruz-Hernandez et al. |
| 2014/0289642 | A1* | 9/2014 | Prasad .................. G06F 3/048 715/745 |
| 2014/0337791 | A1 | 11/2014 | Agnetta et al. |
| 2014/0380185 | A1* | 12/2014 | Kulas ..................... G06F 3/041 715/745 |
| 2014/0380209 | A1* | 12/2014 | Tsukamoto ........... G06F 3/0484 715/763 |
| 2015/0007069 | A1* | 1/2015 | Huang ................ G06F 3/04817 715/763 |
| 2015/0089386 | A1* | 3/2015 | Brisebois .............. G06F 3/0488 715/746 |
| 2016/0026216 | A1 | 1/2016 | Novet |
| 2016/0034138 | A1* | 2/2016 | Xia ....................... G06F 3/0488 715/811 |
| 2016/0034140 | A1 | 2/2016 | Navsariwala et al. |
| 2016/0162149 | A1* | 6/2016 | Lee ...................... G06F 1/1694 715/835 |
| 2017/0103732 | A1 | 4/2017 | Schantz et al. |
| 2017/0212631 | A1* | 7/2017 | Kim .................... G06F 3/04883 |

OTHER PUBLICATIONS

IBM. List of Patent Applications Treated as Related, Appendix P, Dated Jan. 24, 2018, 2 pages.

\* cited by examiner

CUSTOMIZING MOBILE DEVICE OPERATION BASED ON TOUCH POINTS

BACKGROUND

The present invention relates generally to the field of mobile devices, and more particularly to customizing a mobile device interface based on touch points.

A mobile device is a computing device small enough to hold and operate in the hand. Typically, the device has either a flat screen display with a small numeric keypad or alphanumeric keyboard, or a touchscreen providing a virtual keyboard and buttons (icons) on-screen. Many such devices can connect to the Internet and interconnect with other devices, such as: car entertainment systems or headsets via Wi-Fi, Bluetooth®, or near-field communication (NFC). Integrated cameras, digital media players, mobile phone, and Global Positioning System (GPS) capabilities are common. Power is typically provided by a lithium battery. Mobile devices may run mobile operating systems that allow third-party applications specialized for said capabilities to be installed and run.

Early pocket-sized devices were recently joined in the marketplace by larger, but otherwise similar, tablet computers. Input and output is now usually via a touchscreen interface. Smartphones and personal digital assistants may provide much of the functionality of a laptop or desktop computer, but more conveniently. Mobile devices often contain sensors, such as: accelerometers, compasses, magnetometers, and gyroscopes, allowing detection of orientation and motion. Mobile devices may provide biometric user authentication, such as: facial recognition or fingerprint recognition.

SUMMARY

Aspects of an embodiment of the present invention disclose a method, computer program product, and computing system for customizing a mobile device interface based on touch points. A processor receives detection of points of contact between a user and a mobile device. A processor analyzes the points of contact between the user and the mobile device. A processor determines how many hands the user is holding the mobile device with. A processor determines a modification for a user interface for the mobile device, wherein determining the modification comprises: presenting a keyboard selected from the group consisting of: a first keyboard, based on a determination that the user is holding the mobile device with one hand, and a second keyboard, based on a determination that the user is holding the mobile device with two hands. A processor causes the modified user interface to be displayed on the mobile device.

DETAILED DESCRIPTION

Embodiments of the present invention recognize that how a user holds a mobile device influences how best to operate the mobile device. Mobile devices are held and operated in many different ways. For example, a user in some situations may operate a mobile device: one-handed, cradling phone, using thumb to operate; cradling phone in one hand, while using the index finger on the other hand to operate; and two handed, using both thumbs to operate. Embodiments of the present invention also recognize that screen size and position can influence a user's ability to interact with a graphical user interface (GUI) of the mobile device (e.g., a user operating a device one-handed may have trouble reaching items on the far side of the screen). Embodiments of the present invention recognize that virtual keyboard selection and application selection are both important when operating a mobile device. When keyboard is mentioned herein, it should be assumed to mean a virtual keyboard. For example, a swipe-style keyboard may be most effective for one-handed operation, while a traditional keyboard may be better for two-handed operation. Also, for example, some applications work well in one-handed operation, while other applications may be near impossible to operate one-handed and using only a thumb. Embodiments of the present invention disclose a method of customizing a mobile device user interface to be cognizant of how a user is holding and operating the mobile device.

Embodiments of the present invention disclose a system that uses a touch sensitive bezel and/or a touch sensitive back/sides on a mobile device to detect contact with skin and derive both how the mobile device is being held and how the mobile device will be operated (i.e., one-handed with thumb, two-handed, etc.). Additionally, embodiments of the present invention disclose a system that customizes the placement of user interface objects, keyboard type, and available applications, based on determining how a user is holding and operating a mobile device.

Embodiments of the present invention will now be described in detail with reference to the Figures.

Figure 1:
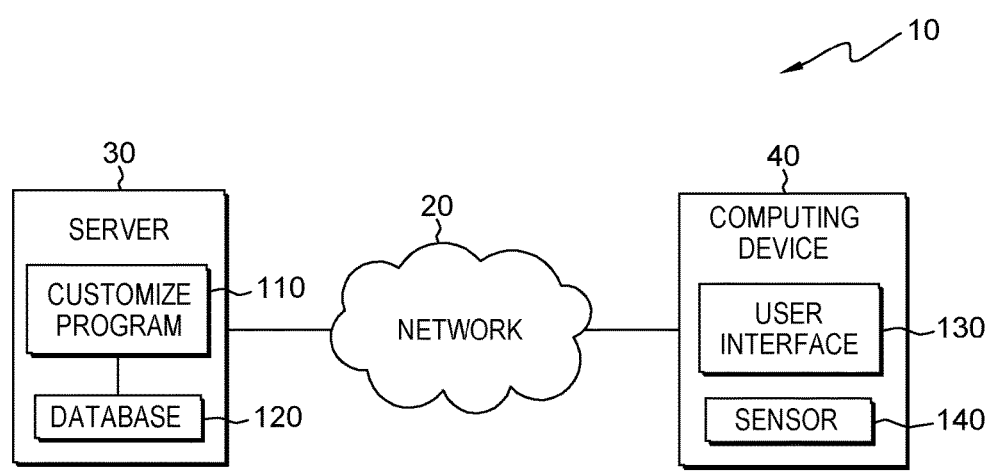
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains customize program 110 and database 120. In other embodiments, server 30 may include customize program 110, database 120, and/or other components, as depicted and described in further detail with respect to FIG. 3.

Computing device 40 may be a personal device (e.g., mobile phone or smartphone), desktop computer, laptop computer, netbook computer, or tablet computer. In general, computing device 40 may be any electronic device or computing system capable of processing program instructions, sending and receiving data, and communicating with other devices over a network. In the depicted embodiment, computing device 40 contains user interface 130 and sensor 140. In other embodiments, computing device 40 may include user interface 130, sensor 140, and/or other components, as depicted and described in further detail with respect to FIG. 3.

Customize program 110 customizes a mobile device interface based on touch points of a user interacting with computing device 40. In doing so, customize program 110 receives detection of contact with computing device 40 from sensor 140. Customize program 110 analyzes the points of contact. Customize program 110 determines a customized user interface. Customize program 110 causes the customized user interface to be displayed. In the depicted embodiment, customize program 110 resides on server 30. In other embodiments, customize program 110 may reside on another server, computing device 40, or another computing device, provided that customize program 110 can access database 120, user interface 130, and sensor 140.

Database 120 may be a repository that may be written to and/or read by customize program 110. In some embodiments, customize program 110 may create a list of the applications that require two-handed operation and store the list to database 120. In other embodiments, database 120 may store information about devices and users who may be authorized to use the devices. In the depicted embodiment, database 120 resides on server 30. In other embodiments, database 120 may reside on another server, computing device 40, or another computing device, provided that database 120 is accessible to customize program 110.

User Interface 130 may be any graphical user interface used to access information from server 30 and/or computing device 40, such as information gathered or produced by customize program 110 or information gathered or produced by sensor 140, respectively. In some embodiments, user interface 130 may be the touch screen of a computing device 40 (e.g., mobile phone). In other embodiments, user interface 130 may be a software program or application that enables a user at computing device 40 to access database 120. In the depicted embodiment, user interface 130 resides on computing device 40. In other embodiments, user interface 130 may reside on another computing device or another server, provided that user interface 130 is accessible to customize program 110.

Sensor 140 may be any device capable of detecting events or changes in an environment and providing a corresponding input. In one embodiment, sensor 140 may provide a corresponding output of a change in a user's hand position to customize program 110. Examples of sensor 140 may be, but is not limited to: a fingerprint sensor; optical sensor; facial recognition sensor; accelerometer; and/or gyroscope. In some embodiments, sensors, such as sensor 140, may be operably affixed to one or more devices, such as, for example, a smartwatch, wearable device, mobile device, etc. In other embodiments, sensor 140 may reside on another computing device or another server, provided that sensor 140 is accessible to customize program 110.

Figure 2:
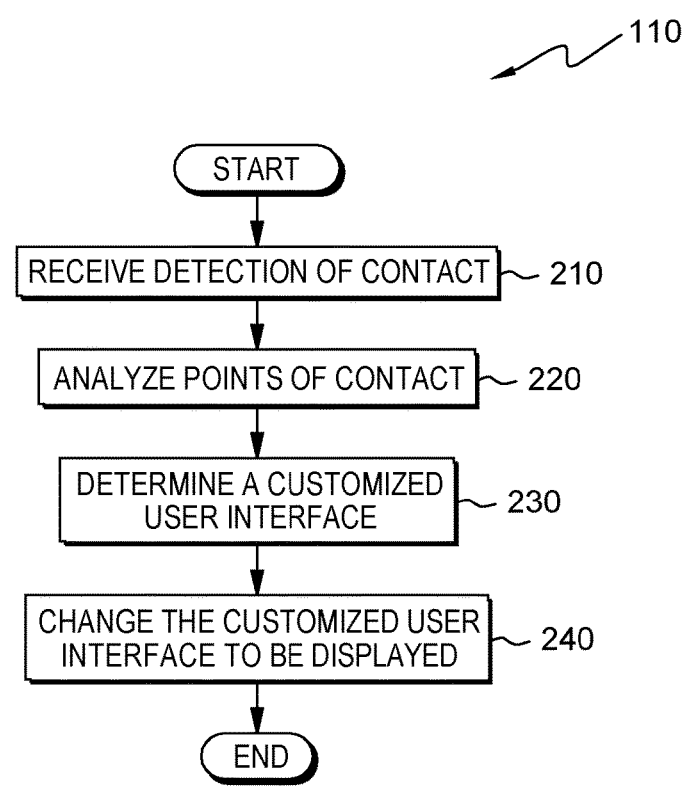
FIG. 2 depicts a flowchart of the steps of a customize program, executing within the computing system of FIG. 1, for customizing a mobile device based on touch points, in accordance with an embodiment of the present invention.

FIG. 2 depicts a flowchart of the steps of a customize program, executing within the computing system of FIG. 1, in accordance with an embodiment of the present invention. Customize program 110 customizes a mobile device interface based on touch points.

In step 210, customize program 110 receives detection of contact. The bezel and back of computing device 40 are fitted with touch sensors, such as sensor 140, which can detect, in general. For example, when computing device 40 makes contact with skin (e.g., a user's fingers or palm). In one embodiment, customize program 110 receives detection of contact through the touch points on the touch sensitive bezel and/or the touch sensitive back/sides. In some embodiments, customize program 110 receives detection of contact through sensor 140. In other embodiments, customize program 110 recognizes a user's preference of handling computing device 40 via fingerprint scan and retrieves the user's preferences from database 120. For example, the user may store different preferences under the fingerprint of different fingers (i.e., one preference could be provided with a thumb print and a second preference could be provided with the fingerprint of a right index finger). Another example could be that all of the user's fingerprints and palm prints could be used to provide a particular preference (i.e., the way the user is holding the phone could provide that user's preference by retrieving the saved preference from database 120). Customize program 110 may store the received points of contact information for a particular user to database 120 for future use. The future use may be for training purposes, the fingerprint recognition, or anything else for which the received points of contact could be used.

In step 220, customize program 110 analyzes the points of contact. By analyzing the touch points on computing device 40, customize program 110 can derive how the user is holding computing device 40. For example, in one embodiment, customize program 110 derives the difference between holding computing device 40 with one hand or holding computing device 40 with two hands, as well as cradling computing device 40 for operation with one hand compared to cradling computing device 40 to hold in one hand to operate with the other hand. In some embodiments, customize program 110 analyzes the points of contact by determining which part of the hand has come into contact with which sensor 140 on the touch sensitive bezel and/or the touch sensitive back. In other embodiments, customize program 110 analyzes the points of contact by estimating how far the user could reach, based on the particular touch points via sensor 140. For example, two hands on either side are going to be able to reach most of the screen, whereas just one hand on one side will more than likely not be able to reach the other side. By way of another example, customize program 110 could consider the estimated size of the user's hand to determine the reach of the particular user's fingers on the screen. Customize program 110 may store the analyzed information to database 120 for future use.

In some embodiments, for example, if the user is holding computing device 40 with two hands but takes off one hand for a couple of seconds to enjoy a sip of water, customize program 110 will recognize the change to one-handed use and automatically toggle to a one-handed display mode until the user begins to use two hands again. At this point, customize program 110 will automatically toggle back to a two-handed display mode. In another example, customize program 110 may not automatically toggle to a one-handed display mode when one hand is removed. In other embodiments, customize program 110 may a predetermined time period (e.g., ten seconds) before toggling to a one-handed display mode, giving the user time to remove one hand for a short period for any reason, such as, taking a sip of water.

In some embodiments, customize program 110 uses facial recognition via sensor 140 to determine the orientation of the user. For example, if the user is laying down but using a computing device 40 in landscape mode, the gyroscope is going to think the user is sitting up and using the computing device 40 in portrait mode. Customize program 110 alleviates this concern by, for example, recognizing the orientation of the user's face and adjusting the screen accordingly.

In step 230, customize program 110 determines a customized user interface based on the determinations of how computing device 40 is being held and how computing device 40 will be operated. Based on this knowledge, customize program 110 determines a customized user interface on computing device 40 to reflect how the user is holding and operating computing device 40. In one embodiment, customize program 110 customizes the screen position (user interface objects), keyboard selection, and available application selection. In an embodiment, for the screen position, customize program 110 moves aspects of user interface 130 (e.g., application icons) to the left, right, up, or down to stay within reach of how the user is holding and operating computing device 40. When customize program 110 moves aspects of user interface 130, there may be blank space that is inaccessible. Customize program 110 may add additional information in this inaccessible space, because even though the space is inaccessible, the space is still visible to the user.

In another embodiment, for the screen position, customize program 110 rearranges the application icons, such that the most frequently utilized applications are in better reach for the user. In one embodiment, for the keyboard selection, customize program 110 uses, for example, a swipe-style keyboard for one-handed operation or a traditional keyboard for two-handed operation. Customize program 110 can automatically switch between a swipe-style keyboard and a traditional keyboard, dynamically, as the user adjusts the grip on computing device 40, based on whether the user is holding computing device 40 with one hand or two hands. In some embodiments, for the application selection, customize program shows only application icons for applications that can be operated comfortably based on how the user is holding and operating computing device 40. To determine what is comfortable for a particular user, customize program 110 may require the user to do particular training exercises to determine the reach that the user may have while holding computing device 40 at different angles and in different positions (not shown).

For example, customize program 110 may not show application icons for applications on a home screen that require two-handed operation if the user is operating the device with only one hand. In this example, during one-handed operation, the application icons for applications that require two-handed operation may disappear from the home screen or the application icons may appear as grayed out as unavailable. To determine which applications require two-handed operation, customize program 110 uses any technique that may give such information (not shown). For example, customize program 110 may analyze the graphical user interface of an application interface to identify the location of the buttons to determine if the application requires two-handed operation. If the buttons are spread across the entire screen, customize program 110 determines that particular application requires two-handed operation. On the other hand, if the buttons are close together and to one side of the screen, customize program 110 determines that particular application does not require two-handed operation.

Additionally, customize program 110 may create a list of the applications that require two-handed operation and store the list to database 120. For example, customize program 110 may search database 120 for previously stored information about a user's preference to certain applications and the user's preference holding and operating computing device 40. Another example, customize program 110 may search outside databases for information on the use of various applications for mobile devices. Another example, customize program 110 may retrieve usage information about the application once the application is downloaded to computing device 40. Customize program 110 may store the determined customized user interface to database 120 for future use.

In step 240, customize program 110 causes the customized user interface to be displayed. In one embodiment, customize program 110 automatically causes the customized user interface to be displayed. In some embodiments, customize program 110 causes the customized user interface to be displayed after receiving acknowledgment from the user to display the customized user interface. In other embodiments, customize program 110 causes the customized user interface to be displayed for a predetermined time period that is determined by the user. For example, while at work, the user mostly uses one hand to operate computing device 40; therefore, once customize program 110 determines that the particular user is operating computing device 40, customize program 110 may display the customized user interface during normal business hours in the one hand mode of display.

In one embodiment, customize program 110 may cause the customized user interface to be displayed by, for example: determining that the user is operating computing device 40 with one hand; retrieving the list of applications that require two-handed operation of computing device 40; and displaying the applications on the home screen of computing device 40 that do not require two-handed operation. In this example, customize program 110 may switch, automatically and dynamically, between displaying, on the home screen of computing device 40, application icons that require two-handed operation and application icons that require one-handed operation, based on how the user is holding computing device 40. In one embodiment, all application icons may be displayed if the user has no hands on computing device 40.

Customize program 110 can use this method on any mobile device, including a tablet. For example, customize program 110 would consider how the user is holding the tablet (e.g., one handed, two handed, or no hands) and customize the user experience, accordingly, based on screen position, keyboard selection, and application selection.

Figure 3:
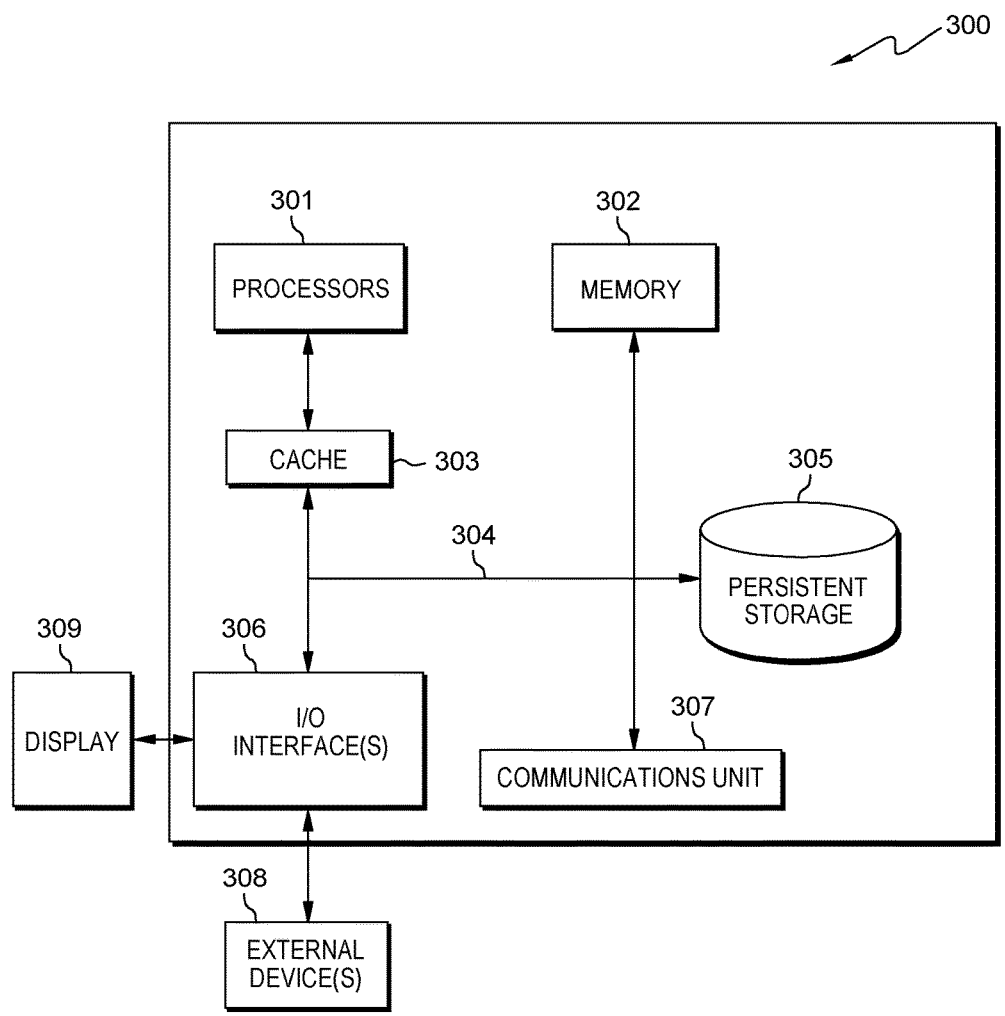
FIG. 3 depicts a block diagram of components of the server and/or the computing device of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Customize program 110 and database 120 may be downloaded to persistent storage 305 of server 30 through communications unit 307 of server 30. User interface 130 and sensor 140 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., customize program 110 and database 120, can be stored on such portable computer readable storage media and can be loaded onto persistent storage 305 of server 30 via I/O interface(s) 306 of server 30. Software and data used to practice embodiments of the present invention, e.g., user interface 130 and sensor 140, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for customizing a mobile device interface based on touch points, the method comprising:
   receiving, by one or more processors, detection of points of contact between a user and a mobile device, wherein the points of contact are detected through one or more touch sensors affixed to a bezel of the mobile device and a back surface of the mobile device;
   analyzing, by one or more processors, the points of contact between the user and the mobile device;
   determining, by one or more processors, a first application that requires two-handed operation;
   creating, by one or more processors, a list of applications that require two-handed operation including, at least, the first application;
   determining, by one or more processors, a modification for a user interface for the mobile device, wherein determining the modification comprises:
      presenting, by one or more processors, a keyboard selected from the group consisting of: a first keyboard, based on a determination that the user is holding the mobile device with one hand, and a second keyboard, based on a determination that the user is holding the mobile device with two hands, wherein the first keyboard is a swipe-style keyboard and the second keyboard is a traditional keyboard;
   determining, by one or more processors, the user is operating the mobile device with two hands;
   determining, by one or more processors, the user has removed one hand from the mobile device and is now operating the mobile device with one hand; and
   toggling, by one or more processors, automatically, the modified user interface from a two-handed operating mode to a one-handed operating mode, wherein toggling the modified user interface from a two-handed operating mode to a one-handed operating mode comprises:
      causing, by one or more processors, the modified user interface to be displayed on the mobile device, wherein the modified user interface includes, modified keyboard type, and modified available applications, and wherein causing the modified user interface to be displayed on the mobile device comprises:
      retrieving, by one or more processors, the list of applications that require two-handed operation; and
      excluding, by one or more processors, application icons from the list of applications that require two-handed operation from a home screen of the mobile device, wherein the applications that require two-handed operation automatically disappear during the toggling.

* * * * *